Figure 1:
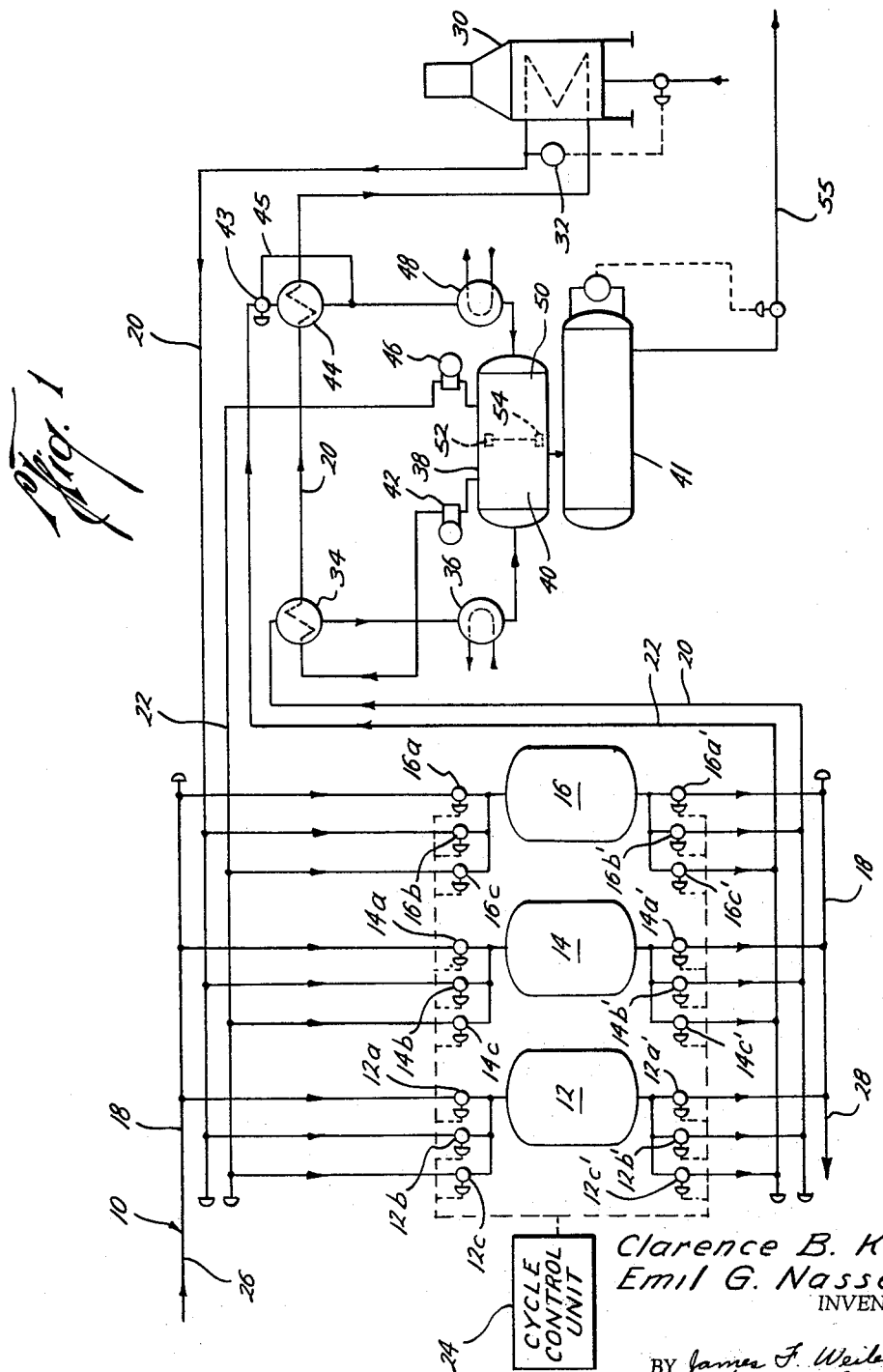

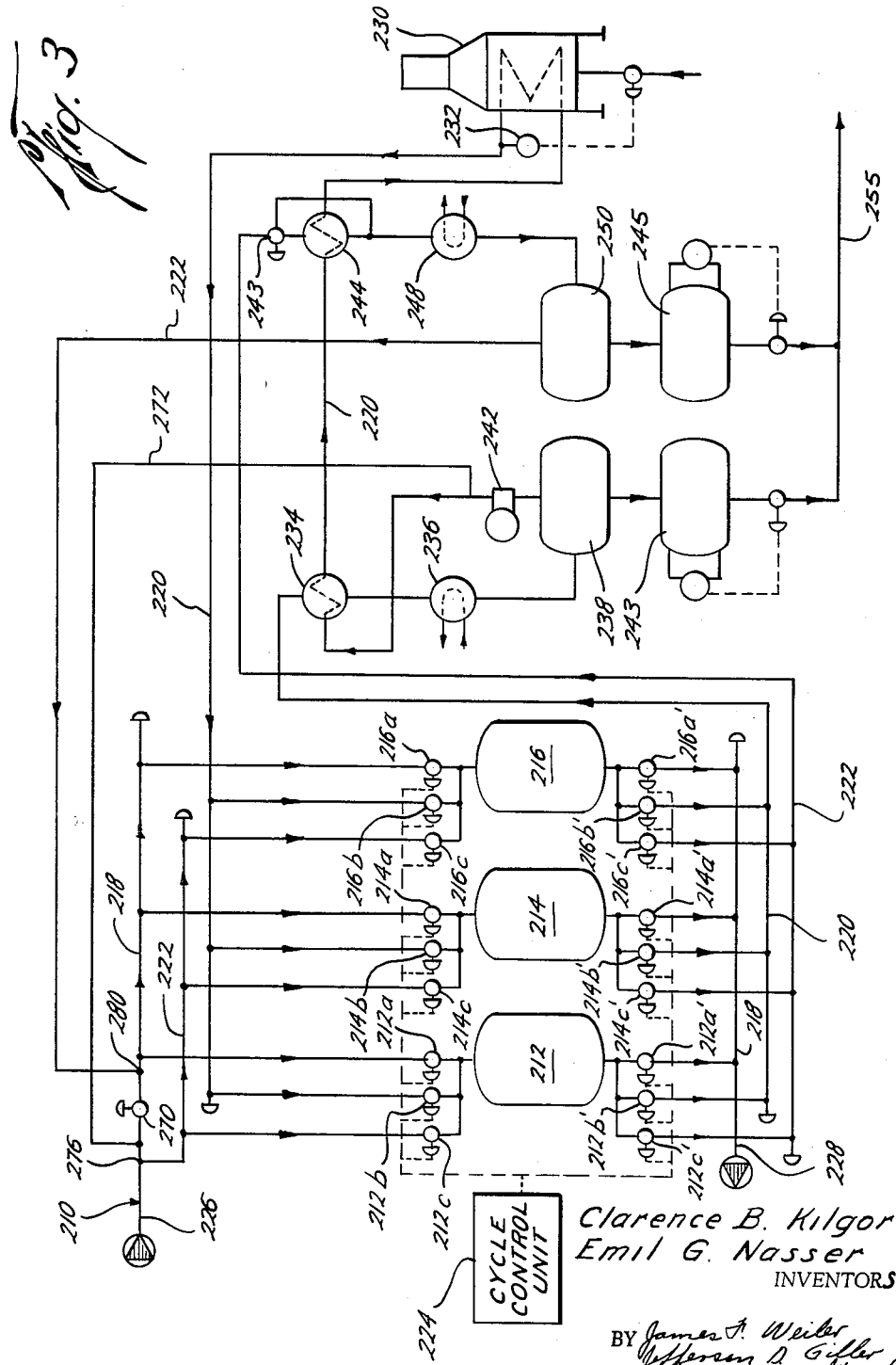

United States Patent Office 3,137,549
Patented June 16, 1964

3,137,549
PROCESS OF AND APPARATUS FOR RECOVERING SELECTED COMPONENTS FROM A FLUID STREAM
Clarence B. Kilgore and Emil G. Nasser, Houston, Tex., assignors, by mesne assignments, to Tenex Corporation, Houston, Tex., a corporation of Texas
Filed Dec. 27, 1962, Ser. No. 247,644
13 Claims. (Cl. 55—33)

The present invention relates to a process of an apparatus for recovering selected components from a fluid stream, and more particularly relates to such a process and apparatus which recovers condensables from a gas stream. This application is an improvement to our co-pending patent application, entitled Process of and Apparatus for Recovering Condensables from a Gas Stream, Serial No. 66,098, now U.S. Patent No. 3,121,002, filed October 31, 1960.

Generally, it is old to recover selected components or condensables such as water and hydrocarbons from a hydrocarbon gas stream by alternately passing the gas stream through a plurality of beds of adsorbent material which adsorbs the condensables from the gas stream. Normally, when one of the beds has become saturated with the condensables, a hot gas is passed through the bed heating it, vaporizing the condensables adsorbed therein, and driving the condensables out of the hot bed. The effluent or hot gas vapors driven out of the hot bed is then passed through a condenser and to an accumulator where the condensed liquid is drawn off. After the condensables have been driven out of the heated bed, a cooling gas is passed through the heated bed to cool or purge the bed and prepare it for adsorbing more condensables from the gas stream. Thus, normally, each of the beds alternately goes through an adsorption and a regeneration cycle, the regeneration cycle consisting of a heating and a cooling phase or cycle.

In the usual method of regeneration the effluent or outflow from the bed being heated is kept separate from the effluent or outflow from the bed being cooled. That is, the effluent from the bed being heated is cooled and the condensable adsorbate is condensed and removed and the remaining vapor is circulated through a heater and back to the bed being heated. Simultaneously, the effluent from the bed being cooled is cooled and the condensable adsorbate is condensed and removed and the remaining vapor is returned to the bed being cooled in systems using a recycle compressor for recirculating the cooling gas such as shown in our co-pending application, or back to the main gas stream in systems using a portion of the main gas stream for cooling or out the gas outlet in systems using residual gas cooling. However, at the beginning of each cycle, regardless of what system of cooling or purge is used the adsorbate content in the effluent from the bed being heated is less than the adsorbate content in the effluent from the bed being cooled. This relationship exists for an interval of time until after which time the adsorbate content of the heating gas effluent exceeds the adsorbate content of the cooling gas effluent due to the change in temperature of each of the beds.

The present invention is directed to improvements in the process and apparatus of recovering selected components from a fluid stream in which at least two portions of the stream are simultaneously and continuously but alternately going through first and second process cycles would provide efficient conditions of operation and increase the recovery of the components from the fluid stream.

It is an object of this invention to provide a process of and an apparatus for recovering condensables from a gas stream by providing, during the interval of time at the beginning of each cycle when the adsorbate content of the heating gas is less than the adsorbate content of the cooling gas, that the stream with the greater adsorbate content be used for heating and the stream with the lesser adsorbate content be used for cooling.

It is the further object of the present invention to provide a process of and an apparatus for recovering condensables from a gas stream by directing the effluent from the beds being heated and cooled, during the interval of time at the beginning of each cycle when the adsorbate content of the heating gas is less than the adsorbate content of the cooling gas, so that the effluent from the bed being heated passes into the cooling gas circuit and the effluent in the bed being cooled passes into the heating gas circuit.

A still further object of the present invention is the provision of the process of and apparatus for providing for a sequence of operation of the process so that the rich adsorbate in the effluent from the bed just beginning to be cooled is passed into the heating gas system in order to provide a greater recovery of the condensables from the gas stream.

Yet a still further object of the present invention is the provision of a process of and an apparatus for recovering condensables from a hydrocarbon gas stream by passing the stream through at least three adsorbent beds which are simultaneously and continuously, but alternately going through an adsorption, a heating regeneration cycle and a cooling regeneration cycle and at the beginning of each cooling cycle to pass the effluent in the bed being cooled into the heating gas system and to pass the effluent in the bed being heated into the cooling gas system until the adsorbate content in the effluent from the bed being heated is more than the adsorbate content in the effluent from the bed being cooled and, at that time, passing the effluent from the bed being heated into the heating gas system for the remainder of the regeneration cycle and passing the effluent from the bed being cooled into the cooling gas system for the remainder of the regeneration cycle.

Yet a still further object of the present invention is the provision of a process of and an apparatus for separating water and hydrocarbons from a gas stream which is alternately passed through at least three beds of adsorbent material which are simultaneously and continuously, but alternately going through an adsorption cycle, a heating regeneration cycle, and a cooling regeneration cycle in which means are provided downstream of each bed for passing the effluent from the bed on the heating regeneration cycle into the cooling gas system at the beginning of the cycle, simultaneously passing the effluent from the bed on the cooling regeneration cycle into the heating gas system at the beginning of the cycle and, after the adsorbate content of the effluent from the bed going through the heating regeneration gas cycle becomes greater than the adsorbate content of the effluent passing through the bed going through the cooling regeneration cycle, switching the effluent from the bed being heated back into the heating gas system and switching the effluent from the bed being cooled back into the cooling gas system.

Other and further objects, features and advantages will be apparent from the following description of a presently preferred embodiments of the invention, given for the purpose of disclosure, and taken in conjunction with the accompanying drawings, and where, FIGURE 1 is a schematic flow diagram illustrating one form of the process and apparatus according to present invention utilizing a closed system which includes heating and cooling cycles.

Figure 2:
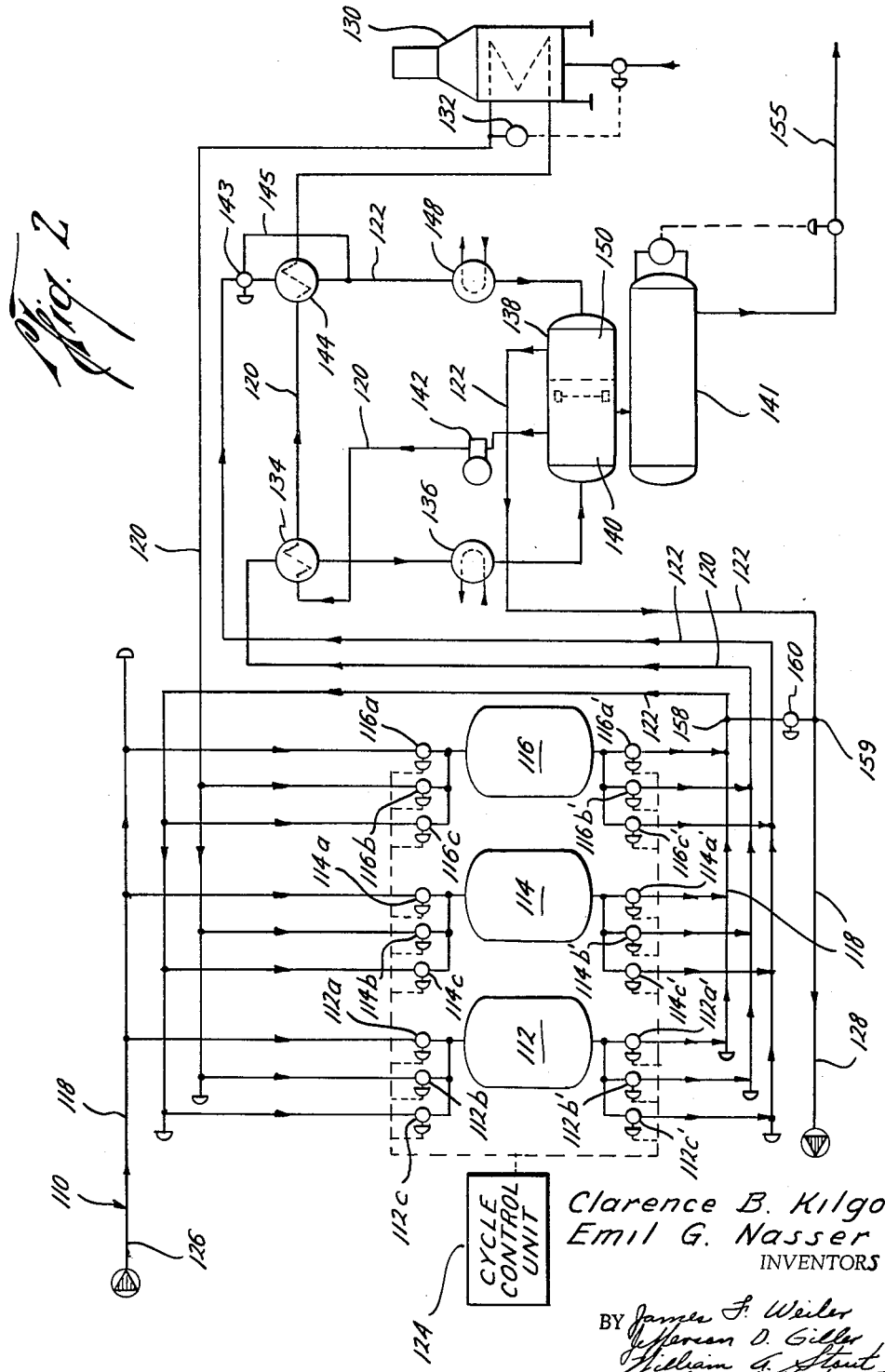

FIGURE 2 is a schematic flow diagram illustrating another form of the process and apparatus according to the present invention utilizing a residue gas cooling system, and FIGURE 3 is a schematic flow diagram illustrating still another form of the present process and apparatus according to the present invention utilizing main gas inlet cooling.

The present invention will presently be described in its operation of removing water and/or recovering propane, butane, and natural gasoline and heavier hydrocarbons from a stream of natural gas; however, this is by way of example only and it may be used to separate one or more components from a fluid mixture. The present invention will be generally described in conjunction with a processing system which alternately passes gas through at least three beds of adsorbent material which are simultaneously and continuously, but alternately going through an adsorption cycle, a heating regeneration cycle and a cooling regeneration cycle.

Referring now to the drawings and particularly to FIGURE 1, the adsorption system 10 of the present invention generally includes a plurality of beds 12, 14 and 16, an adsorption circuit 18 for passing the gas stream alternately through one of the beds whereby the condensables such as water and hydrocarbons are absorbed from the stream, a heating circuit 20 whereby a heated gas is passed through an absorbent bed which has become saturated and drives off and vaporizes the condensables and includes apparatus to recover the condensables from the supply of heated gas, and a cooling circuit 22 for cooling the heated bed and preparing it for another adsorption cycle. The process thus generally includes an adsorption and a regeneration cycle, and the regeneration cycle includes a heating and a cooling cycle. Thus the adsorption, heating and cooling processes are generally and normally each operating continuously and simultaneously with each other, each cycle being shifted to a succeeding adsorbent bed at the end of each cycle.

The beds 12, 14 and 16 may contain a suitable adsorbent material for adsorbing condensables from the gas stream such as silica gel and/or activated carbon. Each of the adsorbent beds 12, 14 and 16 has an inlet and outlet line and valves arranged to alternately connect each of the beds to the adsorption circuit 18, the heating circuit 20 and the cooling circuit 22. For convenience of reference the valves are given the same prefix number as their corresponding adsorbent bed and the inlet valves are given a suffix of "a," "b," "c" corresponding to the valves in the adsorption circuit 18, the heating circuit 20, and the cooling circuit 22, respectively. The outlet valves are similarly numbererd with the addition of the suffix being primed. A suitable cycle control unit 24 is provided for controlling the operation and sequence of all of the inlet and outlet valves to the adsorbent beds 12, 14 and 16, and any convenient means is satisfactory and no further description is believed necessary. However, the cycle control unit 24 operates the inlet and outlet valves to establish sequence of operation. Normally, this sequence is arranged so that each bed is placed first in adsorption, second in regeneration heating, and third in regeneration cooling.

As previously mentioned, in the usual method of regeneration, the effluent or outflow vapors from the bed being heated is cooled and the condensable adsorbate is condensed and removed and the remaining vapor is circulated through a heater and back again through the bed being heated. Simultaneously the effluent or vapor from the bed being cooled and the condensable adsorbate is condensed and removed and the remaining vapor is returned to the bed being cooled in systems using a closed cooling gas cycle such as disclosed in our co-pending patent application, Serial No. 66,098, now U.S. Patent No. 3,121,002.

However, applicants have found that at the beginning of each heating and cooling cycle the adsorbate content in the effluent from the bed being heated is less than the adsorbate content in the effluent in the bed being cooled. The reason for this is that the bed being cooled was just previously in the heating cycle so that, at the beginning of the cooling cycle, the vapor now in that bed is still a rich gas and the residual heat still in that bed will be pushed through that bed stripping it of this rich gas and thereby providing an effluent from that bed which is rich in adsorbate content. Also, the bed which begins the heating cycle has in the previous cycle been in the main gas line circuit where it has been on the adsorption cycle and adsorbing the condensables from the main gas stream which is relatively cool. Thus, the bed just beginning the heating cycle is cool and has a relatively lean gas vapor in it and the bed must be heated up for a period of time before the effluent or vapors emitted from the bed are rich in adsorbate content. And the hot effluent vapors from the bed which has just finished the heating cycle, even after being condensed, are still relatively richer in adsorbate than the effluent from the bed just starting the heating cycle.

Therefore, at the beginning of each cycle the vapors from the bed being heated are leaner or have less adsorbate content than the vapors from the bed being cooled for an interval of time. During this particular interval of time, it would be desirable and would result in a greatly increased recovery of adsorbate to have the effluent stream with the greater adsorbate content be used for heating and the stream with the lesser adsorbate content be used for cooling. One reason for this is that if the richer effluent is used for cooling, the bed being cooled would readsorb adsorbate from the effluent and be less efficient on the next adsorbation cycle than if the leaner effluent is used for cooling the bed. A second reason is that the adsorbate which would be readsorbed would thus not be recovered until it was reprocessed in the next heating cycle thereby providing an inefficient operation. A third reason that it is desirable to have the rich vapors in the heating cycle to optimize condensing conditions and thus more efficient recovery is obtained in the heating cycle.

The present invention, therefore, is specifically directed to diverting the effluents from the outlets of the gas beds being heated and cooled, during the interval of time at the beginning of each cycle when the adsorbate content of the heating gas is less than the adsorbate content of the cooling gas, so that the gas from the bed being heated passes into the cooling gas circuit and the gas from the bed being cooled passes into the heating gas circuit. This may be accomplished by any suitable means such as appropriately arranging the sequence of operation of the outlet valves of the adsorbent beds or by installing appropriate cross-over lines downstream from the beds and upstream of the gas-liquid separators.

The adsorption circuit 18 merely connects one of the beds between the main gas stream inlet and the outlet. Thus the gas stream would enter the adsorption circuit 18 from line 26, the main gas stream, and pass through the bed adsorbing the condensables from the gas stream and the resulting lean gas would pass out of the system through the main gas stream outlet 28.

The heating circuit 20 includes a heater 30 which may be heated by any conventional means and has a suitable temperature control 32. After the gas is heated it is passed through the bed which has become saturated thereby vaporizing the adsorbate and driving it from the saturated bed. Conventionally, the heated regenerated gas passes from the saturated bed and may pass through a heat exchanger 34, giving up heat to the portion of the heating circuit 20 in which gas is being directed toward the heater 30. The rich gas then continues from the heat exchanger 34 to a suitable condenser 36 and then to a gas scrubber 38. Compartment 40 of the gas scrubber 38 is the heating gas scrubbing compartment or heating gas scrubber where the condensables are separated from the vapors. The condensed liquids are then passed through a liquid product accumulator 41 and the separated gas returns to the regeneration heating gas compressor 42 through the heat exchanger 34 where it receives heat, to the heat exchanger 44 where it receives heat from the cooling circuit gas which has just passed from the hot bed, and the separated gas returns to the regeneration heater 30 to repeat the cycle. The heating cycle is continued until the adsorbent bed has reached a sufficiently high temperature to effectively drive off most of the adsorbed condensables and then the heating circuit 20 is connected by valves to another bed which has just become saturated.

Conventionally, in the closed cooling circuit 22 another gas stream is forced by the regeneration cooling compressor 46 through the hot adsorbent bed through which hot regeneration gas has been passed, cooling the heated bed as well as driving off the vaporized adsorbate left in the bed from the previous heating regeneration cycle, then successively through the heat exchanger 44 where the heat from the cooling circuit 22 is given up to the heating circuit 20 to the gas returning to the heater 30, then to a condenser 48 where vaporized adsorbate is condensed, and then to a regeneration cooling gas accumulator compartment 50. The separated liquid drains to the accumulator compartment 50 and the separated gas returns to the regeneration of cooling gas compressor 46 to continue in the cycle. The condensed liquid in the compartment 50 passes through port 54 in the scrubber 38 to the compartment 40 and then is collected in the liquid accumulator 41.

The above description, as to the normal operation of the adsorption circuit 18, the heating circuit 20 and the cooling circuit 22, is as described in our co-pending application, Serial No. 66,098, now U.S. Patent No. 3,121,-002. And as previously stated the sequence of the inlet and outlet valves are arranged in the usual and normal method so that each bed is first placed in adsorption, secondly in regeneration heating, and thirdly in regeneration cooling and then repeats the process. Thus, in the usual method of regeneration the effluent or outflow from the bed being heated is cooled and the condensable adsorbate is condensed and removed and the remaining vapor is circulated through a heater and back to the bed being heated. Simultaneously, the effluent of vapor from the bed being cooled is cooled and the condensable adsorbate is condensed and removed and the remaining vapor is returned to the bed being cooled in units using a closed cooling cycle. However, at the beginning of each cycle the adsorbate content in the vapor in the bed being heated is less than the adsorbate content in the vapor from the bed being cooled. This relationship exists for an interval of time until the one bed is heated to a certain point and the other is cooled to a certain point and then the adsorbate content of the heating gas effluent exceeds the adsorbate content of the cooling gas effluent.

The present invention is directed to the process of, during this interval of time in order to increase the adsorbate recovery, to have the effluent stream with the greater adsorbate content used for heating and the effluent stream with the lesser adsorbate content used for cooling. Thus, appropriate downstream apparatus such as the outlet valves are arranged so that during the initial part of each regeneration cycle the effluent from the bed being heated passes into the cooling gas circuit and the effluent from the bed being cooled passes into the heating gas circuit. However, the upstream apparatus and connections to the inlets of the beds are not changed.

In operation, referring to FIGURE 1, and assuming that each cycle is beginning, assume that the adsorption bed 12 is beginning the adsorption cycle, and that beds 14 and 16 are on the regeneration cycle with bed 14 beginning the heating regeneration cycle and bed 16 beginning the cooling regeneration cycle. Thus, as to bed 12, gas flows from the hydrocarbon gas stream 26 in the adsorption circuit 18 through the valves 12a and 12a' through the bed 12 and out the gas stream outlet line 28. Bed 12 thus adsorbs condensables from the gas stream. At the same time in the heating circuit 20 the heater 30 heats the gas stream forced through the circuit 20 by the heating gas compressor 42 and through inlet valve 14b through the previously saturated adsorbent bed 14 so that the bed 14 is heated and when heated, the heated gas will drive off the adsorbed condensables. However, bed 14 has in its previous cycle been in adsorption and therefore bed 14 is at the beginning of its heating cycle and is in a cool condition and the vapors in the adsorption cycle have been relatively lean, cool gasses. Therefore, instead of passing the lean, cool effluent in bed 14 out of valve 14b' back to the heating circuit 20, the effluent from bed 14, since it is low in adsorbate content and is cool at this part of the heating cycle, is passed through valve 14c' to the cooling gas circuit 22, to condenser 48, passed to the separator compartment 50, and the scrubber 38 whereby the recovered liquid drains through the liquid product accumulator 41 through the liquid port 54 and out line 55 and the separated gas is then passed to the regeneration cooling gas compressor 46 and is used as the cooling gas in the cooling cycle of adsorbent bed 16.

Simultaneously, and at the beginning of this cycle, adsorbent bed 16 is being cooled by the cooling circuit 22. However, bed 16 on its previous cycle had been on the heating cycle. Therefore, at this time, bed 16 is still rich in adsorbate and has considerable residual heat which will be pushed through bed 16 stripping it of the rich gasses still present from the previous heating cycle. Normally, the cooling gas supply from circuit 22 passes from bed 16 through the outlet valve 16c'. However, instead of passing the gas out outlet valve 16c' during this initial portion of the cooling cycle, the gas is passed out through outlet valve 16b', and the rich vapors in bed 16 are passed to the heating gas circuit 20 instead of the cooling gas circuit 22. Thus, the rich effluent from bed 16, during this initial part of the cycle, passes through the heat exchanger 34 giving up heat, and passes through the condenser 36 where the yet rich gas is cooled and condensed and then into the separating compartment 40 of the gas scrubber 38 where the liquids are drawn off and transferred to the liquid product accumulator 41 and out line 55 and the vapors return to the compressor 42. The separated vapors after passing through the compressor 42 are still relatively rich and are heated in the heat exchanger 34 and the heat exchanger 44, and pass through the heater 30 to be heated and then continue in the heating gas circuit 20 to pass to bed 14 to continue heating and driving off the adsorbed condensables.

However, after a certain interval of time bed 14 becomes sufficiently heated and bed 16 becomes sufficiently cooled so that the effluent from the bed 14 becomes richer in adsorbate than the effluent from bed 16. Therefore, at this point it is preferable to switch the effluents of these two beds so as to have the effluent with the greater adsorbate content used in the heating circuit and the effluent with the lesser adsorbate content used in the cooling circuit. Thus, as to bed 14, outlet valve 14c', is closed and outlet valve 14b' is opened and the heated condensables from the bed 14, now providing a rich effluent from the bed, are passed to the heating circuit 20 through heat exchanger 34, giving up heat, and passing through the condenser 36 where the rich gas is cooled and condensed and then into the separating compartment 40 of the gas scrubber 38 where the liquids are drawn off and transferred to the liquid product accumulator 41 and out line 55 and the vapors return to the compressor 42. The separated vapors after passing through the compressor 42 are heated in the heat exchanger 34 and the heat exchanger 44, and pass to the heater 30 to be heated and then continue the cycle in the heating circuit 20 back to bed 14.

Simultaneously with the operation of the outlet valves of bed 14, the outlet valves of bed 16 are actuated, as at this point in the cooling cycle bed 16 has become cooled and the effluent from that bed are now lower in adsorbate content than the output from bed 14. Thus, outlet valve 16b' is closed and outlet valve 16c' is opened so that the gas in bed 16 passes into cooling circuit 22 and into the heat exchanger 44 where it gives up heat to the heating circuit gas and is then condensed in condenser 48 and passes to the separator compartment 50 and the scrubber 38 whereby the recovered liquid drains to the liquid product accumulator 41 through the liquid port 54 and out line 55 and the separated gas returns to the regeneration cooling gas compressor 46 to continue the cooling cycle in the cooling circuit 22 to the adsorbent bed 16.

After each cycle has been concluded, the cycle control unit actuates the various control valves to transfer bed 12 from the adsorption circuit 18 to generally the heating circuit 20, bed 14 is transferred from the heating circuit 20 to generally the cooling circuit 22, and bed 16 is transferred from the cooling circuit 22 to the adsorption circuit 18. However, in accordance with the present invention and at the beginning of each new cycle, the output from bed 16 is passed to the cooling gas circuit and the output of bed 14, which is now on the cooling cycle, is transferred to the heating gas circuit for an interval of time until the adsorbate content of the effluent from the bed being heated becomes greater than the adsorbate content of the effluent from the bed being cooled.

While the present invention has been described in conjunction with a closed cooling cycle, it is equally applicable to other processes in which at least two portions of a stream from which it is desired to select components are simultaneously and continuously, but alternately going through first and second process cycles. For instance, and by way of example only, the present invention may be utilized with a residual gas cooling system as shown in FIGURE 2 or a main line inlet gas cooling cycle as shown in FIGURE 3, the "100" series and "200" series being applied to the parts corresponding to those in FIGURE 1 for convenience of reference.

Referring now to FIGURE 2, the adsorption system 110 generally includes a plurality of beds 112, 114 and 116, an adsorption circuit 118 for passing the inlet gas stream alternately through one of the beds whereby the condensables are adsorbed from the inlet gas stream, a heating circuit 120 whereby heated gas is passed through an adsorbent bed which has become saturated and vaporizes and drives off the condensables and includes apparatus to recover the condensables from the supply of heating gas, and a cooling circuit 122 for cooling the heated bed with residue gas from the bed on adsorption and preparing it for another adsorption cycle.

The adsorption circuit 118 merely connects one of the beds between the main gas stream inlet and the outlet. Thus, the gas stream would enter the adsorption circuit 118 from line 126, the main gas stream, and pass through the bed adsorbing the condensables from the gas stream and part of the resulting lean gas would pass out of the system to the main gas outlet 128 through a pressure creating means, such as valve 160.

The heating gas circuit of FIGURE 2 is similar to that of FIGURE 1 and includes a heater 130 which heats the gas which is passed through the bed which has become saturated, a heat exchanger 134, a condenser 136, a gas scrubber 138, and a heating compressor 142, and a heat exchanger 144.

However, the cooling circuit 122 differs from that in FIGURE 1 in that it utilizes part of the lean cool gas flowing from the bed on the adsorption cycle to serve as a cooling medium in the cooling cycle for cooling the heated bed. That is, the cooling gas circuit 122 receives a lean cool gas stream at point 158 which is forced by back pressure into the cooling circuit 122 by the valve 160 causing the cooling gas to pass through the heated bed, then through one of the outlet valves to the cooling circuit 122, the heat exchanger 144, the condenser 148. Then from the condenser 148 the vaporized adsorbate is condensed, the gas and liquid separated, and the separated gas instead of being recirculated as in FIGURE 1, is directed to the gas outlet 128 at point 159.

In the conventional operation of the apparatus 110, the sequence of the inlet and outlet valves are arranged so that each bed is first placed in adsorption, secondly in regeneration heating, and thirdly in cooling, and then repeats the process. Thus, in the usual method of regeneration the effluent or outflow from the bed being heated is cooled and the condensable adsorbate is condensed and removed and the remaining vapor is circulated through a heater and back to the bed being heated. Simultaneously cooling gas, which is a portion of the main lean cool gas leaving the bed on the adsorption cycle, is circulated from the adsorption line 118 through point 158 to the cooling circuit 122 and through the bed being cooled, out the normal outlet valves and the condensable adsorbate is condensed in the cooling condenser 148 and removed and the remaining vapor is returned to the main gas outlet line 128 at point 159. The point 159 at which the cooling gas returns to the main gas stream leaving the adsorption bed is at a lower pressure than the lower point 158 from which the cooling gas was taken from the main gas stream, the required difference in pressure being caused by the regulating valve 160.

However, as in the operation of FIGURE 1, at the beginning of each cycle, the absorbate content of the vapor in the bed being heated is less than the adsorbate content of the vapor from the bed being cooled. The present invention is therefore applicable to the process of FIGURE 2 and is directed to the process of having the effluent stream with the greater adsorbate content used for heating and the effluent stream with the lesser adsorbate content used for cooling. Thus, appropriate downstream apparatus such as the outlet valves on the beds are arranged so that during the initial part of each regeneration cycle the effluent from the bed being heated passes into the cooling gas circuit and the effluent from the bed being cooled passes into the heating gas circuit, similarly to that already described with reference to FIGURE 1.

Referring now to FIGURE 3, a process for removing selected condensables from a gas stream is shown utilizing a main inlet gas cooling cycle. Similarly to FIGURES 1 and 2, the adsorption system 210 generally includes a plurality of beds 212, 214 and 216, which are alternately, but simultaneously going through the processes of adsorption, regeneration heating, and regenerating cooling. The adsorption circuit 218 merely connects one of the beds between the main gas stream inlet 226 through a pressure restriction such as valve 270 and the outlet 228.

The heating circuit 220 includes a heater 230 which heats the gas to be passed through the bed which has become saturated driving off the adsorbed condensables. Conventionally, the heater regeneration gas passes from the saturated bed and may pass through a heat exchanger 234, a suitable condenser 236, a gas scrubber 238 and the separated vapors are then passed by a heating compressor 242 back to the heater 230 for continuing the cycle while the liquid is drained to product accumulator 243. The heating circuit 220 differs from the heating circuits in FIGURES 1 and 2 in that an equalizing line 272 connects the regeneration heating circuit 220 with the inlet gas stream to provide a means of equalizing the pressure in the heating gas circuit 220 with the main gas stream. Of course, the heating circuits of FIGURES 1 and 2 could be modified to utilize a similar equalizing line, if desired.

In the cooling cycle, a portion of the inlet gas is used for cooling the heated bed. Conventionally, in the cooling circuit 222 a portion of the main gas stream inlet gas is received at point 276 and directed through the hot adsorbent bed through which hot regeneration gas has just been passed thereby cooling the heated bed as well as driving off the vaporized adsorbate left in the bed from the previous heating regeneration cycle. The cooling gas then passes through the outlet valves through circuit 222 to a suitable heat exchanger 244, to condenser 248 where the vaporized adsorbate is condensed and then to a cooling gas accumulator compartment 250. The recovered liquid is drained to a product accumular 245 and the separated gas returned to the main inlet gas stream at point 280 to flow into the adsorption circuit 218.

However, in FIGURE 3 as in FIGURES 1 and 2, at the beginning of each cycle the adsorbate content in the vapor in the bed being heated is less than the adsorbate content in the vapor in the bed being cooled. The present invention therefore is applicable to the main gas inlet cooling system of FIGURE 3, and is directed to the process of having the effluent stream with the greater adsorbate content used for heating and the effluent stream with the lesser adsorbate content used for cooling. Thus, as in FIGURES 1 and 2, appropriate downstream apparatus such as the outlet valves on the beds 212, 214 and 216 are arranged so that during the initial part of each regeneration cycle the effluents from the bed being heated passes into the cooling gas circuit and the effluent from the bed being cooled passes into the heating gas circuit, as described in detail in connection with FIGURE 1.

It has been found that by diverting the effluents during the interval of time at the beginning of each cycle that the propane recovery from a natural gas stream can be increased from three to five times.

The present invention, therefore, is well adapted to carry out the objects and obtain the ends and advantages mentioned as well as others inherent therein. While presently preferred embodiments of the invention are given for the purpose of disclosure, numerous changes in the details of construction, arrangements of parts and steps of the process may be made which will readily suggest themselves with those skilled in the art and which are encompassed within the spirit of the invention and the scope of the appended claims.

What is claimed is:

1. The improvement in the process of recovering condensables from a gas stream in which at least three adsorbent beds remove condensables from the stream and are simultaneously and continuously but alternately going through an adsorption cycle where the bed adsorbs and becomes saturated with the condensables, a heating cycle where the saturated bed is heated to drive the condensables out of the saturated bed, and a cooling cycle where the heated bed is cooled in preparation for the next adsorption cycle comprising, initially passing a supply of heating gas successively and continuously through a heater, a saturated bed, and into the cooling cycle downstream of the bed in the cooling cycle; and simultaneously and continuously circulating a supply of cooling gas successively through the bed which has just completed the heating cycle and then into the heating cycle including a condenser and a separator downstream of the bed in the heating cycle but upstream of said condenser and separator; and, after the output gas from the bed being heated becomes richer than the output gas from the bed being cooled, diverting the output of the bed which is being cooled and directing it into the cooling cycle downstream of the bed being cooled; and simultaneously diverting the output of the bed which is being heated into the heating cycle downstream of the bed being heated but upstream of the condenser and separator.

2. The improvement in the process of recovering condensables from a gas stream in which at least three adsorbent beds remove condensables from the stream and are simultaneously and continuously but alternately going through cycles of and connected to circuits of adsorption where the bed adsorbs and becomes saturated with the condensables, heating where the saturated bed is heated to drive the condensables out of the saturated bed, and cooling where the previously heated bed is cooled in preparation for the next adsorption, cycle comprising, initially passing a supply of heating gas successively and continuously through a heater, a saturated bed, and into the cooling circuit including a condenser and separator upstream of said cooling circuit condenser and separator; and simultaneously and continuously circulating a supply of cooling gas successively through the bed starting the cooling cycle, and then into the heating circuit including a condenser and a separator upstream of said heating circuit condenser and separator; and, after the effluent from the bed being heated becomes richer than the output gas from the bed being cooled, diverting the effluent of the bed which is being cooled and directing it into the cooling cycle upstream of said cooling circuit condenser and separator; and, simultaneously diverting the effluent of the bed which is being heated into the heating cycle upstream of said heating circuit condenser and separator.

3. The improvement in the process of recovering condensables from a gas stream in which at least three adsorbent beds remove condensables from the stream and simultaneously and continuously but alternately go through cycles of and are connected to circuits of adsorption, heating, and cooling, and in which the heating circuit includes a heater, a condenser, and a separator, and the cooling circuit includes a cooler downstream from the bed being cooled comprising, initially passing a supply of heating gas successively and continuously through the heater, a saturated bed and into the cooling circuit upstream of the cooler in the cooling circuit; and, simultaneously and continuously circulating a supply of cooling gas successively through the bed starting the cooling cycle and then into the heating circuit upstream of the condenser and separator of the heating circuit; and, after a predetermined time, diverting the effluent of the bed which is being cooled and directing it into the cooling cycle upstream of the cooler in the cooling circuit; and, simultaneously diverting the effluent of the bed which is being heated and directing it into the heating cycle upstream of the condenser and separator of the heating circuit.

4. In an adsorption apparatus for the recovery of condensables from hydrocarbon gas streams which includes a plurality of beds of adsorbent material for removing the condensables by passing the stream alternately through said beds and where the beds are simultaneously and continuously but alternately being connected to circuits of adsorption, heating, and cooling, the improvement in the regeneration circuit which includes the heating circuit and the cooling circuit comprising:

valve means for initially diverting the output of the heating circuit to the cooling circuit downstream of the bed being cooled and for diverting the output of the cooling circuit to the heating circuit downstream of the bed being heated, and valve means for, after a predetermined time, diverting the output of the heating circuit to the heating circuit downstream of the bed being heated, and for diverting the output of the cooling circuit to the cooling circuit downstream of the bed being cooled, all of said valve means being positioned downstream of said adsorbent beds, but upstream of a condenser, separator in the heating circuit, and upstream of a condenser and separator in the cooling circuit.

5. The improvement in the process of recovering condensables from a gas stream in which at least three adsorbent beds remove condensables from the stream and are simultaneously and continuously but alternately going through an adsorption cycle and circuit where each bed adsorbs and becomes saturated with the condensables, a heating cycle and circuit where the saturated bed is heated to drive the condensables out of the saturated bed, and a cooling cycle and circuit where the heated bed is cooled in preparation for the next adsorption cycle and flowing gas between the heating gas circuit and the cooling gas circuit downstream of said beds thereby balancing the gas pressure between cooling and heating gases comprising, initially passing a supply of heating gas successively and continuously to a heater, a saturated bed, and into the cooling circuit downstream of said saturated bed but upstream from the balancing flow of gas between the heating gas circuit and the cooling gas circuit; and simultaneously and continuously circulating a supply of cooling gas successively through the bed which has just completed the heating cycle and then into the heating circuit downstream of said bed but upstream from the balancing flow of gas between the heating gas circuit and the cooling gas circuit; and after the effluent from the bed being heated becomes richer than the effluent from the bed being cooled, diverting the output of the bed which is being cooled from the heating circuit and directing it into the cooling circuit upstream from said balancing flow of gas; and simultaneously diverting the output of the bed which is being heated from the cooling circuit and into the heating circuit upstream from said balancing flow of gas.

6. The improvement in the process of recovering liquids from a gas stream which is continuously and alternately passed through a plurality of beds of adsorbent material to remove the condensables and which beds are simultaneously and continuously but alternately going through an adsorption cycle and a regeneration cycle which includes heating and cooling and which includes the steps of continuously circulating a captive supply of heating gas through a heating circuit which in succession includes a heater, the bed which has completed the adsorption cycle, a condenser, and a separator thereby driving the condensables out of the saturated bed and condensing and separating the condensables from the supply of heating gas; simultaneously and continuously circulating a captive supply of cooling gas through a cooling circuit which successively includes the bed which has completed the heating cycle, a condenser, and a separator whereby the heated bed is cooled and condensables are condensed and separated from the supply of cooling gas, and flowing gas between a point downstream from the condenser in the heating circuit to a point in the cooling circuit which is downstream of the cooling circuit condenser comprising, during the initial part of each cycle directing the effluent from the bed which has just completed the adsorption cycle into the cooling circuit upstream of the condenser in the cooling circuit; and simultaneously and continuously directing the effluent from the bed which has just completed the heating cycle into the heating circuit upstream of the condenser of the heating circuit; and after the effluent from the bed which has just completed the adsorption cycle and which is now being heated becomes richer than the effluent from the bed being cooled, diverting the effluent of the bed which is being cooled and directing it into the cooling circuit upstream of the condenser in the cooling circuit; and simultaneously diverting the effluent from the bed which is being heated into the heating circuit upstream of the condenser in the heating circuit.

7. The process of recovering condensables from a gas stream in which at least three adsorbent beds remove condensables from a stream and simultaneously and continuously but alternately flow through cycles of and are connected to circuits of adsorption, heating and cooling, and in which the heating circuit includes a heater, a condenser, and a separator, and the cooling circuit includes a condenser comprising, initially passing a supply of heating gas successively and continuously through a heater, a saturated bed and into the cooling circuit upstream of the condenser in the cooling circuit; and simultaneously and continuously circulating a supply of cooling gas from the main gas stream into the bed starting the cooling cycle and then into the heating circuit upstream of the condenser and separator of the heating circuit; and after a predetermined time, directing the effluent from the bed which is being cooled and directing it into the cooling circuit upstream of the condenser in the cooling circuit; and simultaneously diverting the effluent of the bed which is being heated and directing it into the heating circuit upstream of the condenser and separator of the heating circuit.

8. The invention of claim 7 including the step of flowing gas between the heating gas circuit and the main gas stream thereby balancing the gas pressures between the heating gas circuit and the main gas stream.

9. The improvement in the process of recovering condensables from a gas stream in which at least three adsorbent beds remove condensables from the stream and are simultaneously and continuously but alternately going through cycles of and are connected to circuits of adsorption, heating and cooling, and in which the heating circuit includes a heater, a condenser, and a separator, and the cooling circuit includes a condenser comprising, initially passing a supply of heating gas successively and continuously through the heater, a saturated bed and into the cooling circuit upstream of the condenser in the cooling circuit; and simultaneously and continuously obtaining a supply of cooling gas from the effluent of the bed on the adsorption cycle and circulating said supply successively through the bed starting the cooling cycle and then into the heating circuit upstream of the condenser and separator of the heating circuit; and after a predetermined time, diverting the effluent from the bed which is being cooled and directing it into the cooling circuit upstream of the condenser in the cooling circuit; and simultaneously diverting the effluent of the bed which is being heated and directing it into the heating circuit upstream of the condenser and separator of the heating circuit.

10. The improvement in the process of recovering condensables from a gas stream in which at least three adsorbent beds remove condensables from the stream and are simultaneously and continuously but alternately going through cycles of and are connected to circuits of adsorption, heating and cooling, and in which the heating circuit includes a heater, a condenser, and a separator, and the cooling circuit includes a condenser comprising, initially passing a supply of heating gas successively and continuously through the heater, a saturated bed and into the cooling circuit upstream of the condenser in the cooling circuit; and simultaneously and continuously obtaining a supply of cooling gas from the gas stream and circulating said supply successively through the bed starting the cooling cycle and then into the heating circuit upstream of the condenser and separator of the heating circuit; and after a predetermined time, diverting the effluent from the bed which is being cooled and directing it into the cooling circuit upstream of the condenser in the cooling circuit; and simultaneously diverting the effluent of the bed which is being heated and directing it into the heating circuit upstream of the condenser and separator of the heating circuit.

11. The improvement in the process of recovering condensables from a gas stream in which at least three adsorbent beds remove condensables from the stream and are simultaneously and continuously but alternately going through cycles of and are connected to circuits of adsorption, heating, and cooling; and in which the heating circuit includes a heater for heating the saturated bed, a condenser, and a separator; and the cooling circuit receives a supply of cooling gas from the main gas stream, passes it through the bed being cooled, through a condenser and back to the main gas line for passage into the adsorption cycle comprising;

initially passing a supply of heating gas successively and continuously through the heater, the saturated bed and into the cooling circuit upstream of the condenser in the cooling circuit; and simultaneously and continuously obtaining the supply of cooling gas from the main gas stream and circulating said supply successively through the bed starting the cooling cycle and then into the heating circuit upstream of the condenser and separator of the heating circuit; and after a predetermined time, diverting the effluent from the bed which is being cooled and directing it into the cooling circuit upstream of the condenser in the cooling circuit; and simultaneously diverting the effluent of the bed which is being heated and directing it into the heating circuit upstream of the condenser and separator of the heating circuit.

12. The improvement in the process of recovering condensables from a gas stream in which at least three adsorbent beds remove condensables from the stream and are simultaneously and continuously but alternately going through cycles of and are connected to circuits of adsorption, heating, and cooling; and in which the heating circuit includes a heater for heating the saturated bed, a condenser, and a separator; and the cooling circuit receives a supply of cooling gas from the effluent of the bed on the adsorption cycle, passes it through the bed being cooled, through a condenser and out of the main gas outlet comprising, initially passing a supply of heating gas successively and continuously through the heater, the saturated bed and into the cooling circuit upstream of the condenser in the cooling circuit; and simultaneously and continuously obtaining the supply of cooling gas from the effluent of the bed on the adsorption cycle, and circulating said supply successively through the bed starting the cooling cycle and then into the heating circuit upstream of the condenser and separator in the heating circuit; and after a predetermined time, diverting the effluent from the bed which is being cooled and directing it into the cooling circuit upstream of the condenser in the cooling circuit; and simultaneously diverting the effluent of the bed which is being heated and directing it into the heating circuit upstream of the condenser and separator of the heating circuit.

13. The invention of claim 3 including exchanging heat between the heating and cooling circuits downstream of the beds, but upstream from the cooler in the cooling circuit and downstream of the condenser in the heating circuit.

References Cited in the file of this patent

UNITED STATES PATENTS

| | | |
|---|---|---|
| 2,880,818 | Dow | Apr. 7, 1959 |
| 2,919,764 | Dillman et al. | Jan. 5, 1960 |